United States Patent Office 2,806,866
Patented Sept. 17, 1957

2,806,866

POLYFLUOROHALOGENATED ORGANIC COMPOUNDS AND METHOD OF PREPARATION THEREOF

William S. Barnhart, Cranford, and Robert H. Wade, West Paterson, N. J., assignors to The M. W. Kellogg Company, Jersey City, N. J., a corporation of Delaware No Drawing. Application August 27, 1954,
Serial No. 452,705

13 Claims. (Cl. 260—408)

This invention relates to a new and useful class of polyfluoro and polyfluorohalogenated organic compounds, and to new methods of preparation for both this new class of compounds and for useful compounds already known. In particular, it relates to new fluorohalogenated carboxylic acids and their salts and to new methods of preparation of polyfluorocarboxylic acids and fluorohalogenated carboxylic acids and their salts.

It is known that polyfluoro alkanoic acids and polyfluoropolychloro acids may be prepared by heating a completely halogenated ethylene with methanol in the presence of a free radical producing catalyst to produce polyfluoro alkanols of the formula $$H—(CF_2—CF_2)_nCH_2OH$$

or the corresponding polyfluoropolychloro alkanols, and thereafter oxidizing the alkanols to alkanoic acids. The polyfluoroalkanoic acids and polyfluoropolychloro alkanoic acids thus produced are useful compounds in that they have good stability and inertness, and in that they are compatible with fluorocarbon polymers and fluorochlorocarbon polymers. However, such polyhalo alkanoic acids are not as stable as they would be without the hydrogen atom on the terminal carbon furthest removed from the carboxylic group, since its presence may lead to the elimination of hydrogen halide and thereby result in the corrosion of metal parts. This elimination may lead to further breakdown of the halo acid due to the reactivity of the carbon-carbon double bond thus produced.

It is also known that perfluoroalkanoic acids having the general formula $$F—(CF_2)_n—COOH$$

may be prepared by the electrochemical fluorination of alkanoic acids in anhydrous hydrogen fluoride with subsequent hydrolysis of the resulting fluorinated acid fluorides. Such acids, being completely halogenated, are very stable. However, this method has not been shown to be applicable to the preparation of long chain fluoroperhalo alkanoic acids, containing halogen atoms other than fluorine, and the presence of other halogen atoms is often desirable to impart increased compatibility with polymers containing halogen atoms other than fluorine. Furthermore, the yield of long chain acids is likely to be lowered due to the increased statistical probability of scission in the fluorination of long chain alkanoic acids.

It has recently been found that perfluoro and fluoroperhaloalkanoic acids may be prepared by the oxidation of a perhalogenated olefin having at least 7 carbon atoms and being at least half fluorinated. The perhalogenated olefins are ordinarily prepared by the thermal cracking of high molecular weight homopolymers or copolymers or perfluoro and/or perfluorochloro olefins. The oxidation reaction is preferably carried out in the presence of potassium permanganate at subzero temperatures. This method is limited in that the chain lengths of the alkanoic acids are determined by the positions of the double bonds in the thermally cracked product and thus cannot be predicted with any degree of accuracy. It is not possible by this method to produce predictably any particular desired alkanoic acid.

It has also recently been found that novel fluorinated acids containing an odd number of carbon atoms may be prepared by treating with fuming sulfuric acid a fluorine-containing telomer prepared by telomerizing an olefin which is at least half fluorinated in the presence of a perhalogenated methane containing a bromine atom. The preferred telomers are the telomers of chlorotrifluoroethylene prepared with bromotrichloromethane as a telogen and containing at least 7 carbon atoms. Both monocarboxylic and dicarboxylic acids may be prepared, but only those having an odd number of carbon atoms in the aliphatic chain. A detailed description of this method of preparation and of the acids prepared thereby may be found in our copending application, Serial No. 452,703, filed August 27, 1954.

It is an object of this invention to provide new fluorohalogenated aliphatic carboxylic acids and their salts.

It is a further object of this invention to provide a method of preparing fluoroperhalo aliphatic carboxylic acids and their salts having an even number of carbon atoms in the aliphatic chain.

It is a further object of this invention to provide a new method of preparing perfluoro aliphatic carboxylic acids and their salts.

It is a further object of this invention to produce new fluorohalo aliphatic carboxylic acids of specific structure in high yields.

Still another object of this invention is to produce new perfluoro and fluoroperhalo aliphatic dicarboxylic acids which are useful in condensations with polyalcohols to produce long chain highly halogenated polymers.

Still another object of this invention is to produce new fluoroperhalo aliphatic carboxylic acids and salts which are useful as dispersing agents for the emulsion polymerization of halogenated olefins.

Still another object of this invention is to produce new fluoroperhalo aliphatic carboxylic esters which are useful as softening agents and plasticizers for the halogenated polymers.

Still another object of this invention is to produce new fluoroperhalo aliphatic carboxylic acid salts which may be used as gelling agents in grease compositions containing chlorotrifluoroethylene polymers.

Other objects will appear hereinafter.

These and other objects and advantages are obtained by treating with fuming sulfuric acid a fluorine-containing telomer prepared by telomerizing an olefin which is at least half fluorinated in the presence of a sulfuryl halide, the halogen atoms of the sulfuryl halide being selected from the group consisting of fluorine, chlorine and bromine atoms, of which no more than one is a fluorine atom.

The preferred telomers which are treated according to this invention are those with the general structure, $$Cl(CF_2—CFCl)_n—Cl$$

wherein $n$ is an integer from 2 to about 16. These telomers are prepared by the telomerizing of chlorotrifluoroethylene in the presence of the telogen, sulfuryl chloride. The telomerization preferably takes place in the presence of benzoyl peroxide which is dissolved in a solvent, such as carbon tetrachloride, while the chlorotrifluoroethylene monomer is added under pressure in a closed system. In a specific example, 3.5 parts of benzoyl peroxide are dissolved in 308 parts of carbon tetrachloride and 135 parts of sulfuryl chloride. 116 parts of chorotrifluoroethylene monomer is added and the system is heated to about 95°

C. for a period of 4 hours with agitation to produce a high yield of relatively low molecular weight polymers having the above formula. The telomeric product is relatively easy to separate into its individual compounds by distillation since it contains only compounds having an even number of carbon atoms, so that each compound has a boiling point relatively far removed from that of the next lower or next higher compound. A detailed description of telomerization with sulfuryl halides may be found in the copending application of William S. Barnhart, Serial No. 294,495, filed June 19, 1952.

It has been found that the telomerization reaction is aided by the presence of sulfur dioxide, as a modifying agent in a mole ratio between about 1 to 10 and about 10 to 1 with the catalyst. A detailed description of a telomerization process in the presence of a sulfuryl halide and sulfur dioxide may be found in the copending application of William S. Barnhart, Serial No. 342,743, filed March 16, 1953.

Telomers produced by sulfuryl halides other than sulfuryl chloride, as telogens, may also be used, provided that they do not produce at the CFCl end of the terminal monomeric unit an end group containing additional fluoride. The preferred telogens other than sulfuryl chloride are sulfuryl bromide, fluorosulfuryl chloride and bromosulfuryl chloride. All of these telogens produce telomers containing a —CFCl$_2$ or —CFClBr end group at one end of the molecule, which may be hydrolyzed in accordance with this invention to produce a carboxylic acid. In general, the telomers of chlorotrifluoroethylene which may be used may be designated as having the formula, $$Y_1(CF_2—CFCl)_nY_2$$

wherein $Y_1$ is a halogen selected from the group consisting of fluorine, chlorine and bromine; $Y_2$ is a halogen selected from the group consisting of chlorine and bromine and having an atomic weight not lower than that of $Y_1$, and $n$ is an integer from 2 to about 16. These telomers produce monocarboxylic acids of the formula, $$Y_1(CF_2—CFCl)_{n-1}—CF_2—COOH$$

and diacids of the formula, $$HOOC—CFCl—(CF_2—CFCl)_{n-2}—CF_2—COOH$$

wherein $Y_1$ and $n$ are defined as above.

Telomers produced from perhalogenated monomers other than trifluorochloroethylene may also be used as starting materials in this invention. Among the perhalogenated monomers which may be used, in addition to chlorotrifluoroethylene, are tetrafluoroethylene and unsymmetrical dichlorodifluoroethylene. In general, the perhalogenated monomers may be designated as those having the structure $CF_2=CX_1X_2$ wherein $X_1$ and $X_2$ are selected from the group consisting of fluorine and chlorine atoms.

These monomers may be either homotelomerized or cotelomerized with each other or with other halogenated olefins, including hydrogen-containing olefins. In order to maintain the chemical stability of the final products, it is preferred that the hydrogen content be kept at a minimum so that the hydrogen-containing olefins should contain at least two fluorine atoms. For optimum stability, it is preferred that no hydrogen be present. Among the halogenated olefins which may be cotelomerized with the aforesaid perhalogenated monomers are, symmetrical dichlorodifluoroethylene, trifluoroethylene and vinylidene fluoride. To produce high yields of fluoroperchloro aliphatic acids of specific structure, homotelomers must be used, since it is impossible to predict the order of alignment of the individual comonomer units in a cotelomer.

The telomers produced from such monomers may be designated as $Y_1—(CF_2—CX_1X_2)_nY_2$ wherein $Y_1$ is a halogen selected from the group consisting of fluorine, chlorine and bromine; $Y_2$ is a halogen selected from the group consisting of chlorine and bromine, and having an atomic weight not lower than that of $Y_1$; $X_1$ and $X_2$ are halogens selected from the group consisting of fluorine and chlorine, and $n$ is an integer from 2 to 16. These telomers produce carboxylic acids having the general formula, $$Z—CFCl—(CF_2—CX_1X_2)_{n-2}—CF_2—COOH$$

wherein Z is a single carbon monofunctional radical selected from the group consisting of carboxylic acid radicals, and perhalomethyl radicals containing halogens selected from the group consisting of fluorine, chlorine and bromine, of which at least 2 are fluorine atoms, and $X_1$, $X_2$ and $n$ are defined as above. More specifically, the aforementioned telomers may be said to produce dicarboxylic acids of the formula $$HOOC—CFCl—(CF_2CX_1X_2)_{n-2}—CF_2—COOH$$

wherein $X_1$, $X_2$ and $n$ are defined as above, and monoacids of the formula $$M—CFCl—(CF_2—CX_1X_2)_{n-2}—CF_2—COOH$$

wherein M is a perhalomethyl radical containing halogen atoms selected from the group consisting of fluorine, chlorine and bromine, of which at least 2 are fluorine atoms, and $X_1$, $X_2$ and $n$ are defined as above.

The telomers produced from the aforesaid monomers with the specific telogen, sulfuryl chloride, may be designated as, $Cl—(CF_2—CX_1X_2)_n—Cl$ wherein $X_1$, $X_2$ and $n$ are defined as above. These telomers produce dicarboxylic acids of the formula specified in the immediately preceding paragraph, and monocarboxylic acids of the formula $Cl—(CF_2—CX_1X_2)_{n-1}—CF_2—COOH$, wherein $X_1$, $X_2$ and $n$ are defined as above.

The telomers produced by the telomerization of chlorotrifluoroethylene with sulfuryl chloride have been designated above as $Cl—(CF_2—CFCl)_n—Cl$, wherein $n$ is an integer from 2 to 16. Such telomers produce monocarboxylic acids of the formula $$Cl(CF_2—CFCl)_{n-1}—CF_2—COOH$$

and dicarboxylic acids of the formula $$HOOC—CFCl—(CF_2—CFCl)_{n-2}—CF_2—COOH$$

wherein $n$ is defined as above.

For optimum surface active properties and for optimum compatibility with perhalogenated polymers, it is desirable that the carboxylic compounds of this invention have a chain length of at least 6 carbon atoms. In other words, the preferred carboxylic compounds are those wherein $n$ is an integer from 3 to 16, or those having a chain length of from 6 to 32 carbon atoms.

The telomers suitable as starting materials for the purpose of this invention are prepared, as stated above, by directly polymerizing the fluoroethylene monomer in the presence of a catalyst and one of the above-mentioned telogens. The yield of telomer of desired chain length will vary with the relative ratio of telogen to monomer, with higher ratios producing a predominance of low molecular weight material, and lower ratios producing a predominance of high molecular weight material. In general, telomers produced by any ratio of telogen to olefin from about 1 to 5 to about 3 to 1 may be used. To produce a high yield of telomer containing from 3 to 16 monomeric units, it is preferred that the telogen to olefin ratio be about 1 to 1.

Catalysts other than benzoyl peroxide, such as di-t-butyl peroxide or dichlorobenzoyl peroxide, may be employed. Favorable results are obtained by using 1% by weight benzoyl peroxide based on the monomer.

Inert solvents may or may not be present in the telomerization process. An inert solvent is any liquid which does not materially alter the normal polymerization of the fluoroethylenic compound in the presence of sulfuryl chloride or other sulfuryl halides. Carbon tetrachloride and tetrachloroethylene are examples of such solvents. It is to be noted that carbon tetrachloride is itself a telogen, but considerably less effective than, for example, sulfuryl chloride, and may, therefore, be regarded as substantially inert.

The telomers described above are hydrolyzed to the corresponding carboxylic acids by treatment with concentrated sulfuric acid containing sulfur trioxide at elevated temperatures. By controlling the temperature, duration of treatment and concentration of the fuming sulfuric acid, monoacids and/or diacids are produced.

The monoacids and diacids of the present invention are formed by subjecting the telomers described above, and particularly the telomers $Cl-(CF_2-CFCl)_n-Cl$ to hydrolysis with concentrated sulfuric acid containing from substantially zero to about 70% excess $SO_3$, at temperatures ranging from about 140° C. to about 300° C. for a period ranging from about 5 to about 50 hours. In general, the lower concentrations of fuming sulfuric acid (containing about 0 to 20% $SO_3$, for example), lower temperatures (between about 140° C. and about 210° C.) and shorter reaction time (5 to 25 hours), are sufficient to hydrolyze the $CFCl_2$ group or CFClBr group to COOH, the diacid being formed in lower yield, if at all, under such conditions.

It is not necessary to operate at the highest extreme of temperature and the highest extreme of $SO_3$ concentration at the same time in order to obtain good yields of diacid. Actually, in a practical sense, one is ordinarily limited to the equilibrium concentration of $SO_3$ in fuming sulfuric acid for any particular temperature of operation. Thus, it may be necessary to sacrifice high $SO_3$ concentration in order to achieve high operating temperature, and vice versa. The optimum combination of conditions for producing high yields of diacids is about 5 to 10% fuming sulfuric acid at 230 to 250° C.

It is possible, of course, to increase the equilibrium concentration of $SO_3$ in fuming sulfuric acid at a particular temperature by increasing the pressure on the system. However, volatile inorganic materials are by-products of this reaction and have, at any particular temperature, a much higher vapor pressure than $SO_3$. Consequently, any increase in the total pressure of the system is primarily taken up by the partial pressure of these volatile gases and produces comparatively little effect with respect to the partial pressure of $SO_3$.

It is also desirable to operate in an increased pressure system when dealing with a low molecular weight telomer, such as the dimer $Cl-(CF_2CFCl)_2-Cl$, which has a boiling point of 135° C. Under increased pressure the dimer is maintained in the liquid phase at higher temperatures.

The reaction is conveniently carried out in a glass or preferably in a metal vessel equipped with a thermometer, stirrer and reflux condenser, the latter being fitted with a tube leading to a vessel containing water or basic solution. The latter device is necessary to trap the $SO_3$ fumes and any other vapors evolved during the course of the reaction. The hydrolysis may be conducted under an atmosphere of nitrogen or other inert gas. Upon completion of the reaction, the reaction mixture is cooled and poured over ice, and the organic material isolated by ether extraction of this aqueous mixture. Any unreacted starting material may be separated from the acidic product by subjection of the ether extract to distillation under reduced pressure. An alternative procedure is to basify the aqueous mixture with a basic reagent such as sodium hydroxide, followed by ether extraction to remove the non-acidic starting material. The basic mixture is then reacidified with $H_2SO_4$ and ether extracted. Subjection of the concentrated ether extract to distillation under reduced pressure will yield the acidic product which, if solid, may be further purified by crystallization and/or redistilled.

Other organic solvents which may be used to extract the organic material from the aqueous mixture are carbon tetrachloride; chloroform; methylene chloride; 1,1,-2-trichloro-1,2,2-trifluoroethane, etc. The acids have been characterized by conventional means, such as by preparation of various salts and by the determination of their neutralization equivalents, boiling points, melting points, surface tension and by chemical analysis.

A more advantageous method of isolating the desired carboxylic acids involves direct extraction of the reaction product with a low-boiling organic solvent which is insoluble in fuming sulfuric acid. Among the solvents which may be used are methylene chloride, 1,2,2-trichloro-1,1,2 - trifluoroethane (Freon 113), carbon tetrachloride, choloroform, 1,1 - dichloroethane, trichlorofluoromethane, 1,1,1-trichloroethane and others.

The advantages of this latter method lie in eliminating the necessity of treating large volumes of fuming sulfuric acid with water and in permitting the reuse of the fuming sulfuric acid. The method also permits the use of vessels made of materials (e. g., carbon steel) which are resistant to anhydrous sulfuric acid, but not to dilute sulfuric acid.

The extract is washed with 25% HCl to remove sulfuric acid and then distilled, with the solvent coming off as the first fraction.

Under the conditions of the fuming sulfuric acid treatment, some formation of acid anhydrides may occur. Monocarboxylic acids may combine to produce acyclic anhydrides of higher molecular weight. Despite their higher molecular weight, the acyclic anhydrides are lower-boiling than the monocarboxylic acids from which they are derived, since the acids are strong acids and highly polar compounds and since the loss of polarity has a greater effect on boiling point than molecular weight increase. The cyclic anhydride is, of course, lower-boiling than the diacid from which it is formed since both the polarity and the molecular weight are decreased.

These anhydrides are readily converted to the acids from which they are derived by the addition of water. On the other hand, the acids may, if desired, be converted to anhydrides by reaction with $SO_3$ or $P_2O_5$.

Carboxylic acids, both monoacids and diacids, produced by this invention, are strong acids and react readily with alkali metal, alkaline earth and other metal hydroxides, carbonates and other basic compounds, to produce corresponding metal salts. The acids also react with gaseous ammonia or with ammonium hydroxide to produce ammonium salts. Metal and ammonium salts of the monocarboxylic acids containing at least 6 carbon atoms are particularly useful as emulsifying agents in the emulsion polymerization of perhalo polymers.

The acids of this invention are thermally stable at temperatures of 200° C. and above. Both the acids and the salts are useful as surface active agents and can be used in highly acid and/or highly corrosive environments, as, for example, in electroplating baths and in sulfuric acid storage batteries.

Esters of the foregoing carboxylic acids are also easily prepared by usual esterification methods involving the reaction of the monoacid or diacid with an alcohol and the removal of water therefrom. Water may be removed by the presence of a water removal agent, such as concentrated sulfuric acid, or preferably may be removed by continuous distillation during the esterification reaction. Esters of the monoacids are particularly useful as softening agents for perhalogenated polymers, and esters of the diacids with poly alcohols form long chain highly halogenated polymers with advantageous properties.

EXAMPLE 1

*Hydrolysis of trimer, $Cl-(CF_2-CFCl)_3-Cl$*

*to*

$Cl-(CF_2-CFCl)_2-CF_2-COOH$
*(3,5,6, trichlorooctafluorocaproic acid)*

A mixture of 0.3 mole of Cl—(CF$_2$—CFCl)$_3$—Cl (B. P. 203° C., $d$=1.82) and 150 ml. of 10% fuming sulfuric acid was heated to reflux with stirring for 36 hours. The homogeneous reaction mixture was then added to ice, made basic and steam distilled to remove starting material (3 ml. of trimer were recovered). The mixture was then reacidified and continuously extracted with ether for 48 hours. The ether extract was concentrated and distilled to yield 59.4 grams (54% yield) of water soluble acid boiling at 132–135° C./20 mm. and having the following characteristics:

Observed neutralization equivalent: 376
Calculated neutralization equivalent: 365 for Cl—(CF$_2$—CFCl)$_2$—CF$_2$—COOH Observed molecular weight: 359 (determined in acetic acid)
Calculated molecular weight: 365 for Cl—(CF$_2$—CFCl)$_2$—CF$_2$—COOH

EXAMPLE 2

*Hydrolysis of tetramer,* Cl(CF$_2$CFCl)$_4$Cl

*to* monoacid, Cl(CF$_2$CFCl)$_3$CF$_2$—COOH
(*3,5,7,8 tetrachloroendecafluorocaprylic acid*)

*and* diacid, HOOC—CFCl—(CF$_2$—CFCl)$_2$—CF$_2$—COOH
(*2,4,6-trichlorononafluorosuberic acid*)

(*a*) A mixture containing 161 grams (0.3 mole, 86 ml.) of Cl(CF$_2$CFCl)$_4$Cl (B. P. 125/10 mm.) and 200 ml. of 20% fuming sulfuric acid was heated with stirring at reflux temperature (230–240° C.) for 46 hours. The mixture, on cooling, separated slowly into two layers. The upper layer which was mostly sulfuric acid was added to ice and neutralized with sodium hydroxide; steam distillation of the basic solution gave only a trace of unreacted starting material. The viscous lower layer was diluted with carbon tetrachloride washed with 25% hydrochloric acid and distilled to yield 85 grams (50% yield) of acidic material boiling mainly at 150–160° C./10 mm.

The main fraction (56.6 grams) had the following properties:

Boiling point: 154–156.5° C./10 mm.
Index of refraction ($n_D^{20}$): 1.3980
Density ($d^{20}$): 1.899
Molar refractivity: Observed: 60.8 (Calculated MR for monoacid=59.83; for diacid=56.61)
Neutralization equivalent: Observed: 492 (Calculated NE of monoacid is 479.9; for diacid=219.7)
Analysis: Calculated for C$_8$F$_{11}$Cl$_4$O$_2$H: Cl, 29.50%; F, 43.55%. Found: Cl, 28.90%; F, 41.02%

Thus, the product acid is identified as having the structure Cl(CF$_2$—CFCl)$_3$—CF$_2$—COOH.

(6.2 grams of a fraction boiling at 159–168° C./10 mm. was also obtained with $n_D^{20}$=1.3970—17.)

(*b*) *Re-use of sulfuric acid layer*

Tetramer (161 grams, 86 ml. 0.3 mole) was refluxed for 24 hours with a mixture of 100 ml. of 20% fuming sulfuric acid and 92.5 ml. of concentrated sulfuric acid (approximately 100% H$_2$SO$_4$). On cooling, the lower organic layer was withdrawn and the upper sulfuric acid layer re-used under similar conditions with second and third 86 ml. portions of tetramer. The organic layer was steam distilled to remove unreacted tetramer. The steam distillation residue (79.6 grams) was diluted with methylene chloride, the solution was washed with dilute hydrochloric acid, the methylene chloride distilled and the crude residual acidic product distilled at reduced pressures. The main portion boiled at 150–162° C./10 mm. and was identified as the monoacid, Cl(CF$_2$CFCl)$_3$—CF$_2$—COOH a second fraction boiling at 140–160° C./1 mm. was collected and found to consist chiefly of the tetramer diacid by determination of its neutralization equivalent as 230 (calculated. N. E. for HOOC—CFCl—(CF$_2$—CFCl)$_2$—CF$_2$—COOH is 220).

Analysis of fraction, B. P. 140–160° C./1 mm: Calculated for C$_8$O$_4$H$_2$F$_9$Cl$_3$: Cl, 21.9; F, 38.9%. Found: Cl, 18.40 (17.70); F, 41.40 (44.34). (No sulfur content.)

EXAMPLE 3

*Autoclave hydrolysis of tetramer to monoacid and diacid*

A mixture of Cl—(CF$_2$—CFCl)$_4$—Cl(2M) and 1 liter of 8% fuming sulfuric acid was charged to a stainless steel autoclave fitted with a vent pipe through the ceiling. The mixture was heated to 230° C. for 29 hours with stirring. The autoclave was discharged by use of an evacuated flask and a piece of bent glass tubing. Material still remaining in the autoclave was washed out with water. The organic phase which was separated rather difficultly, because of suspended brown solid, was distilled directly. The sulfuric acid layer was added to ice, combined with the autoclave washings and extracted with ether for three days. The extracted material was filtered and distilled.

| Yields | G. | Percent |
|---|---|---|
| Cl—(CF$_2$—CFCl)$_4$—Cl | 0 | |
| CF$_2$Cl(CFCl—CF$_2$)$_3$—COOH | 646 | 67.3 |
| HOOC(CFCl—CF$_2$)$_3$—COOH | 156 | .18 |
| Total yield (mono+diacid)=85%. | | |

Infrared analysis showed both the original organic phase and distilled acid fractions to contain carboxyl groups, but no carboxylic anhydride.

Boiling point of C$_8$—diacid=182° C./5 mm.
Observed N. E.=230 (calculated N. E.=220)

A sample of material collected from high boiling fractions from several Cl(CF$_2$—CFCl)$_4$Cl hydrolyses was redistilled. 100 grams of a fraction boiling 135–156° C./0.8 mm. was obtained, having a neutral equivalent of 229. N. E. calculated for HOOC—(CFCl—CF$_2$)$_3$—COOH=220

EXAMPLE 4

*Hydrolysis of predominantly C$_{12}$ fraction of sulfuryl chloride telomer oil*

(*a*) A distilled mixture containing 907 grams of sulfuryl chloride telomer oil (boiling point: 65–100° C./0.1 mm.), 480 ml. concentrated H$_2$SO$_4$ and 520 ml. of 20% fuming sulfuric acid was hydrolyzed at about 230° C. for 30 hours. Upon completion of the reaction, the mixture was made basic with sodium hydroxide and extracted with hexane to remove starting material (only a trace was recovered). The basic solution was then acidified with sulfuric acid and continuously extracted with ether. Concentration of the ether solution yielded 586 grams of extract which was diluted with methylene chloride, filtered, washed with a 1:1 aqueous solution of hydrochloric acid and distilled to yield the following alkali soluble products:

| Boiling point | Weight, grams |
|---|---|
| 116° C./1.0 mm.–140° C./0.7 mm. | 193.1 |
| 157° C./0.8 mm. | 190.8 |
| 170° C./0.7 mm. | 95.6 |
| | 479.5 |

(*b*) A 212 gram portion of crude acid, prepared from the aforesaid fraction of sulfuryl chloride telomer oil under conditions similar to those described in Example 4a, was subjected to distillation under reduced pressure to yield the following fractions:

| Boiling point | Weight, grams | N. E. |
|---|---|---|
| 1. 87/.04–114° C./0.08 mm | 41.7 | 462 |
| 2. 111/0.03–136/0.08 mm | 58.7 | 380 |
| 3. 140° C./0.08 mm | 19.1 | 323 |

The three fractions were soluble in a 5% aqueous sodium hydroxide solution. Assuming the telomer fraction to consist chiefly of Cl(CF$_2$CFCl)$_6$—Cl, it would appear that the higher boiling products are chiefly the diacid HOOC—CFCl—(CF$_2$—CFCl)$_4$—CF$_2$—COOH (calculated N. E.=336) and that the lower boiling fraction is a mixture consisting of the diacid and the monoacid, Cl(CF$_2$CFCl)$_5$—CF$_2$—COOH (N. E.=713).

(c) A mixture containing 186 grams (100 ml.) of the aforesaid fraction of telomer oil and 200 ml. of 20% fuming sulfuric acid was heated to 200–230° C. for 24 hours. To remove starting material, the mixture (2 layers) was poured onto ice, basified with sodium hydroxide, and extracted with two 100 ml. portions of methylene chloride. The mixture was then reacidified with sulfuric acid and extracted with ether in a continuous liquid-liquid extractor for 100 hours. The ether extract was concentrated and the residual oil distilled to yield the following fractions:

| Boiling point, ° C./mm. | Weight, grams | Solubility in 5% NaOH soln. | Solubility in water | N.E. |
|---|---|---|---|---|
| 1. 86/.1–87/0.07 | 34.9 | Mostly soluble | Partly soluble | 1,310 |
| 2. 102/0.02 | 52.7 | Soluble (foams) | Swells or foams | 1,010 |
| 3. 115/0.05 | 23.3 | Soluble or swells (foams). | do | 707 |
| 4. 122/0.04 | 47.1 | do | do | 595 |
| 5. | Trace | | | |
| | 158.0 | | | |

By assuming Cl(CF$_2$—CFCl)$_6$CL to represent the average molecular weight in the distilled telomer fraction, the combined fractions (158.0 grams) represent a 90% yield of C$_{12}$— acid.

$$\frac{770}{713}=1.06$$

Cl(CF$_2$—CFCl)$_6$ClMW—770

Cl(CF$_2$—CFCl)$_5$CF$_2$COOH=713

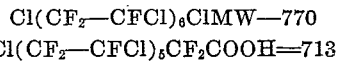

90% yield (assuming all 4 fractions to be acid)

EXAMPLE 5

*Hydrolysis of higher boiling telomer fractions to acid products*

A mixture of 180 grams of sulfuryl chloride-chlorotrifluoroethylene telomer oil (boiling point 135–170° C./0.1 mm.; specific gravity=1.91 at 38° C.) and 200 ml. of 20% fuming sulfuric acid was heated to reflux (about 230° C.) for 12 hours. The separated organic layer was washed with water, the water extracted with ether and the whole distilled to yield four fractions with the following properties:

| Fraction, ° C./mm. | Weight (g.) | Solubility 5% NaOH | Neutralization equivalent |
|---|---|---|---|
| 1. 121/0.3–121/0.1 | 48.1 | Partly | 1,850 |
| 2. 121/0.1–127/0.09 | 51.2 | do | 1,800 |
| 3. 127/0.09–140/0.07 | 43.6 | Reacts hot | 1,260 |
| 4. 140/0.07–158/0.09 | 10.9 | do | 980 |

The N. E.'s of (1) and (2) are high because of unreacted starting material.

EXAMPLE 6

*Preparation of* CF$_2$Cl(CFCl—CF$_2$)$_4$COOH *and* HOOC(CF$_2$—CFCl)$_4$COOH

A mixture of Cl(CF$_2$—CFCl)$_5$Cl (640 g., 0.98 mole) and 500 ml. of 10% fuming sulfuric acid was heated to 215° C. with stirring for 42 hours. The product was isolated by extracting the crude reaction mixture with 1,1,2-trichloro-1,2,2-trifluoroethane for 48 hours. The extract was washed with 25% HCl, concentrated and distilled through an 18" heated jacket, spiral column. A 95% yield of acids was obtained after recovery of 69 grams of unreacted Cl(CF$_2$—CFCl)$_5$Cl.

| | Boiling point, mm. | Neutral equivalent | |
|---|---|---|---|
| | | Calc. | Found |
| CF$_2$Cl(CFCl–CF$_2$)$_4$COOH | 124–126°/0.2 | 596 | 594 |
| HOOC(CF$_2$—CFCl)$_4$COOH | 155–159°/0.06 | 278 | 269 |

EXAMPLE 7

*Preparation of* HOOC(CF$_2$—CFCl)$_3$COOH

A mixture of Cl(CF$_2$—CFCl)$_4$Cl (537 grams, 1 mole) and 500 ml. of 10% fuming sulfuric acid was heated with stirring to 230–250° C. for 50 hours. The product was worked up as above, giving a 75% yield of HOOC(CF$_2$—CFCl)$_3$COOH B. P. 125–127°/0.1 mm. Neutral equivalent: 223; calculated 220. No monoacid was isolated.

EXAMPLE 8

*Preparation of* CF$_2$Cl(CFCl—CF$_2$)$_2$COOH

A mixture of Cl(CF$_2$—CFCl)$_3$Cl (1720 grams, 4.1 mole) and 2050 ml. of 10% fuming sulfuric acid was heated with stirring to 205° C. for 42 hours in a stainless steel autoclave fitted with a vent pipe. The discharged product was extracted with CF$_2$Cl—CFCl$_2$ for 24 hours and the extract washed with 25% HCl and distilled. A 78% yield of CF$_2$Cl(CFCl—CF$_2$)$_2$COOH, B. P. 105–6°/5 mm. was obtained. $n_D^{20}$ 1.3903; $d_{20}^{20}$ 1.860; M. R. calc., 46.5; found, 46.4.

In similar reactions the vent pipe was replaced with a laboratory liquid-liquid extractor and the product extracted directly from the autoclave with CF$_2$Cl—CFCl$_2$ or CH$_2$Cl$_2$.

We claim:

1. A novel polyhalogenated fluorine-containing carboxylic compound of the group consisting of acids having the formula Z—CFCl—(CF$_2$CFCl)$_{n-2}$—CF$_2$—COOH wherein Z is a single carbon mono-functional radical selected from the group consisting of carboxylic acid radicals and perhalomethyl radicals containing halogen atoms selected from the group consisting of fluorine, chlorine and bromine of which at least two are fluorine atoms and $n$ is an integer from 2 to 16.

2. A novel fluorine-containing carboxylic compound of the group consisting of acids of the formula Cl(CF$_2$—CX$_1$X$_2$)$_{n-1}$—CF$_2$—COOH wherein X$_1$ and X$_2$ are selected from the group consisting of fluorine and chlorine atoms and $n$ is an integer from 2 to 16.

3. A novel perhalogenated fluorine-containing acid of the formula

Cl—(CF$_2$CFCl)$_{n-1}$—CF$_2$—COOH wherein $n$ is an integer from 2 to 16.

4. A novel perhalogenated fluorinated dicarboxylic acid having the formula

HOOC—CFCl(CF$_2$—CFCl)$_{n-2}$—CF$_2$—COOH wherein $n$ is an integer from 2 to 16.

5. 3,5,6, trichlorooctafluorocaproic acid.

6. 3,5,7,8 tetrachloroendecafluorocaprylic acid.

7. 2,4,6 trichlorononafluorosuberic acid.

8. A method of preparing a novel fluorinated acid which comprises treating with fuming sulfuric acid at a temperature between about 140° C. and about 300° C., a fluorine-containing telomer, having the formula Y$_1$—(CF$_2$—CX$_1$X$_2$)$_n$Y$_2$ wherein Y$_1$ is a halogen selected from the group consisting of fluorine, chlorine and bromine; Y$_2$ is a halogen selected from the group consisting of chlorine and bromine and having an atomic weight not lower than that of Y$_1$; X$_1$ and X$_2$ are selected from the group consisting of fluorine and chlorine atoms, and $n$ is an integer from 2 to 16.

9. The method of claim 8 wherein Y$_1$ and Y$_2$ are chlorine atoms.

10. The method of claim 8 wherein X$_1$ is a fluorine atom and X$_2$ is a chlorine atom.

11. A method of preparing a perhalogenated fluorine-containing acid which comprises treating a telomer of the formula Cl—(CF$_2$CFCl)$_n$—Cl, wherein $n$ is an integer from 2 to 16, with fuming sulfuric acid at a temperature between about 140° C. and about 300° C.

12. A method of preparing 3,5,6 trichlorooctafluorocaproic acid which comprises treating 1,1,3,5,6 pentachlorononafluorohexane with 10% fuming sulfuric acid at reflux temperatures for 36 hours.

13. A method of preparing 3,5,7,8 tetrachloroendecafluorocaprylic acid and 2,4,6 trichlorononafluorosuberic acid which comprises heating 1,1,3,5,7,8 hexachlorododecafluorooctane with 20% fuming sulfuric acid at a temperature of 230 to 240° C. for 46 hours.

References Cited in the file of this patent

UNITED STATES PATENTS

| | | |
|---|---|---|
| 2,398,430 | Joyce | Apr. 16, 1946 |
| 2,440,800 | Hanford et al. | May 4, 1948 |
| 2,562,547 | Hanford et al. | July 31, 1951 |
| 2,567,011 | Diesslin et al. | Aug. 5, 1951 |
| 2,606,206 | Guenthner | Aug. 5, 1952 |